(12) United States Patent
Laucius et al.

(10) Patent No.: US 12,606,074 B2
(45) Date of Patent: Apr. 21, 2026

(54) DROP BODY TRAILER FOR DIRECT DUMPING CONTAINER WASTE

(71) Applicant: First Response Rail Service, Port Jefferson, NY (US)

(72) Inventors: James M. Laucius, Sherman, CT (US); Ali R. Ramaliu, Setauket, NY (US); Timothy R. Loveland, Providence Forge, VA (US)

(73) Assignee: 1st Response Rail Service, Port Jefferson, NY (US)

( * ) Notice: Subject to any disclaimer, the term of this patent is extended or adjusted under 35 U.S.C. 154(b) by 863 days.

(21) Appl. No.: 17/669,624

(22) Filed: Feb. 11, 2022

(65) Prior Publication Data

US 2022/0258657 A1    Aug. 18, 2022

Related U.S. Application Data

(60) Provisional application No. 63/150,456, filed on Feb. 17, 2021.

(51) Int. Cl.
B60P 1/16        (2006.01)
B60P 1/28        (2006.01)
(52) U.S. Cl.
CPC ................. B60P 1/16 (2013.01); B60P 1/283 (2013.01)
(58) Field of Classification Search
CPC .... B60P 1/04; B60P 1/16; B60P 1/283; B60P 1/43; B60P 1/4471; B60P 1/6418; B60P 1/28; B60P 1/30; B60P 1/44; B60P 1/64; B60P 1/5409; B60P 1/5442; B60P 3/002;

B60P 3/10; B60P 3/1008; B60P 3/1033; B60P 3/105; B60P 3/64; B60P 3/68; B60P 3/07; B60P 3/073; B60P 3/075; B60P 3/2215; B60P 3/2245; B60P 7/02; B60P 7/13; B60P 9/00; B62D 63/062
(Continued)

(56) References Cited

U.S. PATENT DOCUMENTS 2,769,661 A    11/1956    Schonrock
2,803,491 A     8/1957    Brown
(Continued)

OTHER PUBLICATIONS

U.S._Department_of_Transportation_Office_of_Freight_Management_ and_Operations Federal_Size_Regulations_for_Commercial_Motor_ Vehicles__Federal_Highway (2004), pp. 2-3, 12-13. (Year: 2004).*
(Continued)

*Primary Examiner* — Amy R Weisberg
(74) *Attorney, Agent, or Firm* — Faegre Drinker Biddle & Reath LLP

(57)        ABSTRACT

A drop body trailer for transporting and emptying waste from a container. The trailer includes a trailer hitch section configured to engage with a tractor for towing of the trailer by the tractor. A main cargo section is connected to the trailer hitch section and supports the container. A wheel support section is provided that includes a wheel assemble and a flatbed that extends rearward to the rear of the trailer. A door clearance assembly is located on or between the main cargo section and the wheel support section. The door clearance assembly is configured to permit the rear container door to swing open during tipping of the trailer. The door clearance assembly may be a ramp or a hydraulic lift mechanism.

12 Claims, 3 Drawing Sheets

(58) Field of Classification Search
USPC ...... 296/25, 183.2; 280/790; 298/11, 12, 22, 298/17 R, 24
See application file for complete search history.

(56) References Cited

U.S. PATENT DOCUMENTS

| | | | |
|---|---|---|---|
| 3,476,269 A | 11/1969 | Baker et al. | |
| 3,834,111 A * | 9/1974 | Acker | B60P 3/40 52/143 |
| 3,964,625 A * | 6/1976 | Wirz | B60P 1/6463 414/471 |
| 4,496,187 A | 1/1985 | Pontecorvo | |
| 4,603,908 A * | 8/1986 | Weaver | B60P 1/02 298/17 R |
| 5,080,548 A | 1/1992 | Bratlie et al. | |
| 5,114,169 A | 5/1992 | Botkin et al. | |
| 5,127,781 A | 7/1992 | Roarty et al. | |
| 5,354,165 A * | 10/1994 | Booher | B60P 1/16 298/7 |
| 6,019,568 A | 2/2000 | Bratlie | |
| 6,217,122 B1 * | 4/2001 | Kirbie | B60P 1/56 298/12 |
| 8,398,109 B2 * | 3/2013 | Amrine, Jr. | B62D 53/061 296/184.1 |
| 8,827,622 B2 | 9/2014 | Harris | |
| 8,932,000 B2 * | 1/2015 | Poulsen | B65G 7/02 414/809 |
| 2012/0298935 A1 * | 11/2012 | Ross | B60P 3/40 254/2 R |
| 2022/0242297 A1 * | 8/2022 | Tian | B60P 1/6427 |
| 2024/0059204 A1 * | 2/2024 | Tian | B60P 1/045 |

OTHER PUBLICATIONS

Columbia Tippers brochure, Columbia Industries, 12 pages, 2015.

* cited by examiner

DROP BODY TRAILER FOR DIRECT DUMPING CONTAINER WASTE

RELATED APPLICATION

This application is related to and claims priority from United States Provisional Application 63/150,456, filed on Feb. 17, 2021, the disclosure of which is incorporated herein by reference in its entirety.

FIELD OF THE INVENTION

The invention relates to transport trailers and, more particularly, to a trailer with a low center of gravity specifically designed for permitting direct dumping of municipal solid waste containers.

BACKGROUND

Containerized Waste on Rail is a popular alternative to trucking municipal solid waste (MSW) directly to a landfill or waste-to-energy facility due to the closing of landfills in the United States. In such rail transports, the waste containers are shipped on flatbed train cars to a specific unloading location. A loader, such as a forklift, removes the waste container from the flatbed car and places it on convention flatbed trailers for transport to the waste location. The flatbed trailers have a generally flat support surface on which the waste container is placed and are supported by one or more beams that run generally from the front of the trailer to the rear. At the waste location, the trailer is typically placed on a tipper and raised on an angle of approximately 62 degrees to permit the solid waste to pour out of the rear end of the trailer.

There are principally two types of containers used to for transporting MSW. One container has an approximately nine foot height and the other has an approximately twelve foot height. Eastern United States rail systems have adopted the use of the twelve-foot height container as the standard for delivery since they provide high volume (62 cubic yards) and fall within the height restrictions under bridges and through tunnels. These twelve foot tall container work well with railroad standard, eighty-five foot long rail flat cars, carrying four containers per car.

The delivery of the containers over the road to the rail yard or from the rail yard to remove landfill locations is accomplished using trailers. However, since the maximum allowable height over the road is limited to 13' 6", the taller MSW containers pose an issue with transport and emptying. First, those taller containers cannot be placed on a conventional flatbed trailer, which has its flatbed approximately four feet from ground level, since the combined height it too high for many tunnels. In addition, the taller container also has a center of gravity that is significantly higher than the shorter containers. The higher center of gravity creates added instability when transporting the container, such as the load tipping sideways on turns or when navigating the uneven terrain at a waste site.

To alleviate these issues, the taller MSW containers are typically placed on a double drop trailer, which has a lower cargo bed located between a raised section where the trailer hitch is located and the raised bed above the wheel assemblies, and connected to a double rear axle tractor.

Upon arriving at the landfill, a container handler removes the container from the rail car and places the container onto a specially designed off-road truck, specifically, an articulated dump truck (ADT) equipped with a container dump body. The ADT will then proceed to the working face at the landfill and tip the container which empties all the waste. The ADT then returns to the railyard where the container will be removed from the ADT and placed back onto the rail car for the return trip to the original loading point.

However, if the railyard is not located at the landfill, the container will need to be placed onto a double drop chassis and driven over the road to the landfill. A second container handler is then needed to remove the container from the double drop chassis and place the container onto an ADT for delivery of the container to the working face at the landfill where it is emptied. The ADT returns to the staging yard at the landfill and the container handler now places the empty container onto the double drop chassis for the return to the railyard. A second container handler now removes the empty container from the double drop chassis and places the container onto a four-position rail flat car.

The problem with conventional double drop chassis trailers is that it cannot be tipped at a waste location since the container door (or doors) cannot swing open due to interference with the wheel assembles. Thus, it becomes necessary for waste disposal sites to have forklifts or other machinery to remove the waste containers from the double drop trailers and then place them back onto standard flatbed trailers or an articulated dump truck prior to tipping. This increases time and costs associated with waste disposal.

A need exists for an improved trailer that can accommodate the additional height of the container while permitting tipping using existing waste facility tippers.

SUMMARY OF INVENTION

A drop body trailer for transporting and emptying waste from a container using a tipper. The container has a rear container door hinged at a top of the container. The trailer includes a trailer hitch section configured to engage with a tractor for towing of the trailer by the tractor. The trailer hitch section includes horizontal framing members that extend rearward from a front end to a rear end, and cross-frames attaching to and providing structural support for the framing members. A vertical frame structure is attached to the rear end of the framing members and extends downward therefrom to a bottom end.

A main cargo section is connected to the bottom end of the vertical frame structure. The main cargo section has at least two horizontal beams that are each attached at their front end to the bottom of the vertical frame structure and which extend rearward to a rear end of the horizontal beams. A plurality of spaced apart crossbeams attach to and extend between the horizontal beams.

The trailer includes a wheel support section which has a flatbed that extends rearward to the rear of the trailer. A wheel support frame is attached to the bottom of the flatbed and provides support for the flatbed and the wheel assemblies. Two side walls are provided, each side wall attached to and extending upward from a lateral side of the flatbed. The side walls extend along substantially the entire length of the flatbed.

A door clearance assembly is located on or between the main cargo section and the wheel support section. The door clearance assembly is configured to permit the rear container door to swing open during tipping of the trailer.

In an embodiment, the door clearance assembly comprises a ramp section attached to a rear portion of the main cargo section and angling upward to a front end of the wheel support section. The ramp section includes a ramp bed that is supported by a frame structure located underneath. The ramp section includes two side walls, each side wall attached to and extending upward from a lateral side of the ramp bed. The side walls extend rearward for substantially the entire length of the ramp bed.

Preferably the ramp bed of the ramp section forms an angle of approximately 12 degrees with respect to a horizontal plane on the horizontal beams.

In an embodiment the flatbed is substantially horizontal and is approximately 140 inches long and 102 inches wide, the side walls of the wheel support section extend upwards approximately thirty-four inches, and the side walls of the ramp section extend upwards approximately thirty-four inches.

Preferably, the bottom of the horizontal beams in the main cargo section are spaced above the ground approximately eight inches when the trailer is fully loaded, and the main cargo section is approximately 230 inches long.

In an embodiment, the door clearance assembly is a hydraulic lift mechanism attached to the main cargo section or the wheel support frame. The hydraulic lift mechanism is configured to lift a rear bottom edge of the container.

Preferably the wheel support section includes a vertical frame extending downward from the front of the wheel support section and attaching to a rear portion of the main cargo section, and the hydraulic lift mechanism is mounted to either the vertical frame or the main cargo section.

The hydraulic lift mechanism preferably includes a motor configured when activated to extend and retract at least one hydraulic lift, the hydraulic lift configured to raise the rear bottom edge of the container to height substantially the same as the front end of the flatbed of the wheel support section.

Preferably there are two hydraulic lifts, each of the hydraulic lifts including an upper end that is configured to attached to or engage with a respective rear corner of the container through a rear container locking attachment. The rear container locking attachment is adapted to permit the upper end of each hydraulic lift to pivot relative to the rear container corner. Preferably there is at least one front container locking attachment configured to secure a bottom front edge of the container to the main cargo section and to permit pivoting of the bottom front edge of the container relative to the main cargo section.

Preferably the trailer is about 43 feet long, the trailer hitch section is about 126 inches long, the main cargo section is about 249 inches long and the wheel support section is about 145 inches long.

A method is disclosed for emptying waste from a container on the trailer. The method involves the steps of:

placing a waste container onto the main cargo section with its rear container door facing rearward;

securing the container to the main cargo section;

placing the trailer on an unloading tipper ramp and unlocking the rear container door;

activating a hydraulic lifting system to cause a front of the trailer to lift upwards; and allowing the container door to swing open and the contents of the container to spill onto the rear flatbed of the wheel support section between the side walls and off a rear of the trailer.

In an embodiment the door clearance assembly comprises a ramp section attached to a rear portion of the main cargo section and angling upward to a front end of the wheel support section, the ramp section including a ramp bed that is supported by a frame structure located underneath, the ramp section including two side walls, each side wall attached to and extending upward from a lateral side of the ramp bed, the side walls extending rearward for substantially the entire length of the ramp bed. The step of allowing the container door to swing open comprises allowing the contents of the container to spill onto the ramp bed of the ramp section and then pass onto the rear flatbed of the wheel support section.

In an embodiment, the door clearance assembly comprises a hydraulic lift mechanism attached to the main cargo section or the wheel support frame, the hydraulic lift mechanism configured to lift a rear bottom edge of the container. In this embodiment, prior to the step of allowing the container door to swing open the method comprises the step of activating the hydraulic lift mechanism to lift the rear of the waste container to an emptying position where the rear bottom of the container is substantially in alignment with the rear flatbed.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DESCRIPTION OF THE INVENTION

Figures 1, 2:
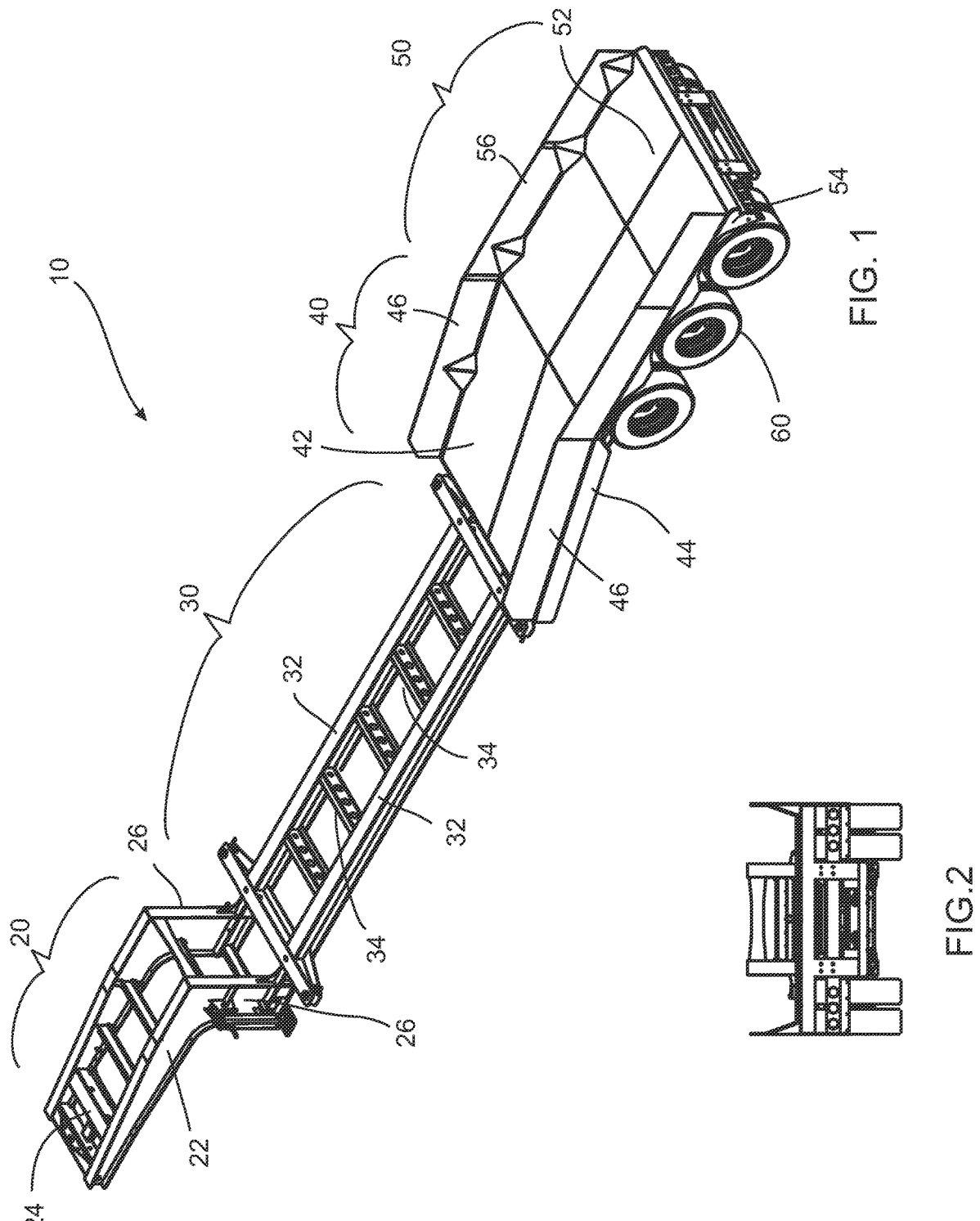
FIG. 1 is a perspective view of a trailer according to one embodiment of the present invention.
FIG. 2 is a rear view of the trailer of FIG. 1.
Figure 3:
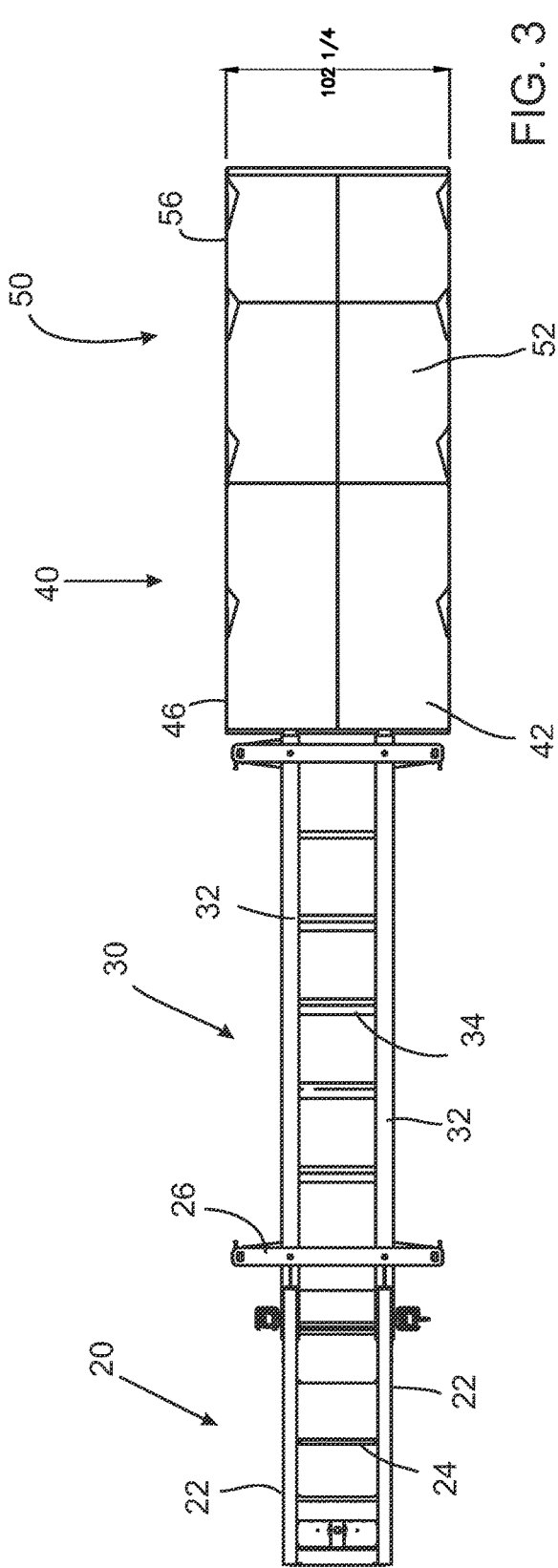
FIG. 3 is a top view of the trailer of FIG. 1.
Figure 4:
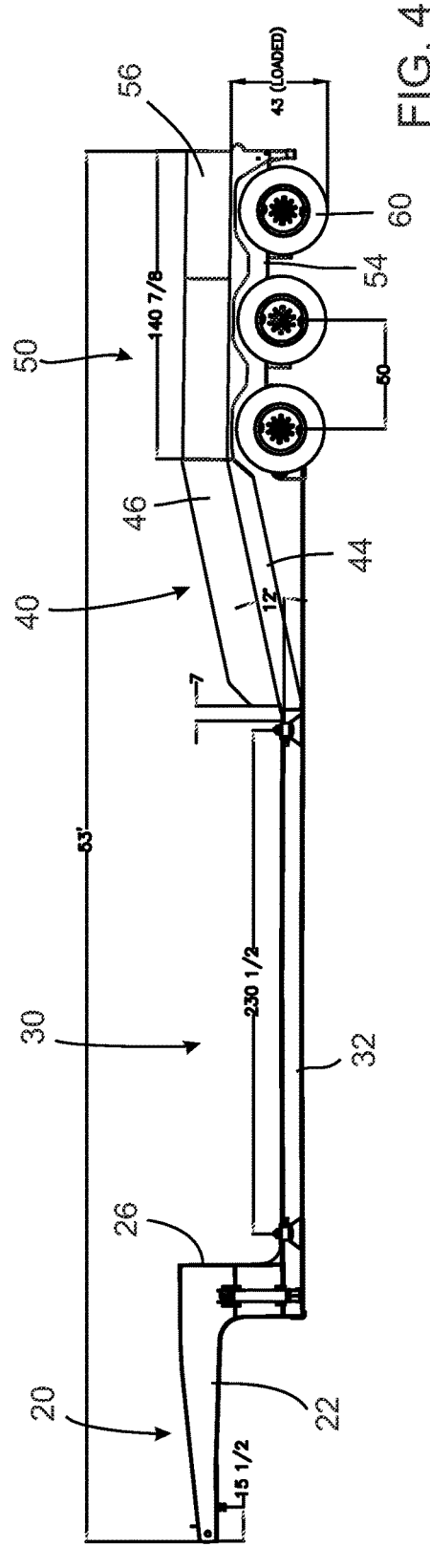
FIG. 4 is a side view of the trailer of FIG. 1.

Referring to the FIGS. 1-4, one embodiment of a trailer 10 according to the invention is depicted. The trailer 10 includes a frame structure that includes a trailer hitch section 20, a main cargo section 30 and ramp section 40 and a wheel support section 50. In an embodiment, the entire trailer 10 is preferably approximately 53 feet long.

The trailer hitch section 20 includes framing members 22 and cross-frames 24. The trailer hitch section 20 is generally conventional and, thus, a detailed description is not needed. The height H above the ground of bottom of the trailer hitch section 20 is generally sufficient for engaging with the conventional tractor, for example approximately 48 inches when the trailer 10 is fully loaded. The trailer hitch section 20 includes a vertical frame structure 26 that extends downward from the end or rear of the framing members 22. The bottom of the vertical frame structure 26 connects to the main cargo section 30. In one embodiment, the trailer hitch section 20 is approximately 126 inches long.

The main cargo section 30 includes at least two horizontal beams 32 that are attached at their front end to the bottom of the vertical frame structure 26. The beams 32 extend rearward and connect to the ramp section 40. A plurality of spaced apart crossbeams 34 connect the horizontal beams 32. The bottom of the beams 32 are spaced above the ground approximately eight inches when the trailer 10 is fully loaded. In one embodiment the main cargo section 30 is approximately 230 inches long. The beams 32 and cross-beams 34 are configured to provide the necessary structural support for the maximum weight of the anticipated cargo, such as the maximum weight of a full container filled with waste.

The ramp section 40 is attached to the rear of the main cargo section 30 and angles upward to the wheel support section 50. The ramp section 40 includes a ramp flatbed 42 that is supported by a frame structure 44 located underneath and which supports the ramp flatbed 42. The ramp section 40 is approximately seventy-two inches long and about 102 inches wide. The ramp section 40 includes lateral side walls 46 that extend upward from the flatbed 42 approximately thirty-four inches and along the length of the ramp flatbed 42. In one embodiment, the ramp flatbed 42 is formed at an angle of approximately 12 degrees from the horizontal. The rear of the ramp section 40 is attached to the front of the wheel support section 50.

The wheel support section 50 includes a rear flatbed 52 that attaches to the rear of the ramp flatbed 42 of the ramp section 40 and extends to the rear of the trailer 10. The rear flatbed 52 is preferably substantially horizontal, however it is contemplated that the rear flatbed could have a slight angle of several degrees without detracting for the invention. In one embodiment the rear flatbed 52 is approximately 140 inches long and 102 inches wide. A wheel support frame 54 is attached to the bottom of the rear flatbed 52 and provides support for the rear flatbed 52 and the wheel assemblies 60. The wheel support section 50 includes lateral side walls 56 that extend upward from the flatbed 52 approximately thirty-four inches and extend along the length of the rear flatbed 52.

During operation, a waste container (not shown), is loaded onto the main cargo section 30 with its top hinged cargo door facing rearward. The waste container may be secured to the main cargo section 30 of the trailer at its four corners using conventional locking mechanisms. In order to empty the contents of the waste container, the tractor trailer is driven onto an unloading tipper. The trailer 10 is unhitched from the tractor and the cargo door on the container is unlocked. The unloading ramp is then tipped using a hydraulic lifting system so that the front of the trailer 10 is lifted upwards. The trailer itself is prevented from rolling off the ramp, such as by stops or a structural block or wall. As the ramp tips, if the container is not secured to the main cargo section 30, container will likely slide toward the rear of the trailer until it contacts the front of the ramp section 40 which will inhibit further sliding. When the unloading ramp gets to approximately sixty-two degrees, the cargo door of the container will swing open and the contents of the container will begin to spill out onto the ramp flatbed 42 between the sidewalls 46. Further tilting of the unloading ramp will cause the contents of the container to continue to spill rearward across the rear flatbed 52 and off the rear of the trailer 10. Once the container is empty, the unloading ramp is lowered.

Figures 5, 6:
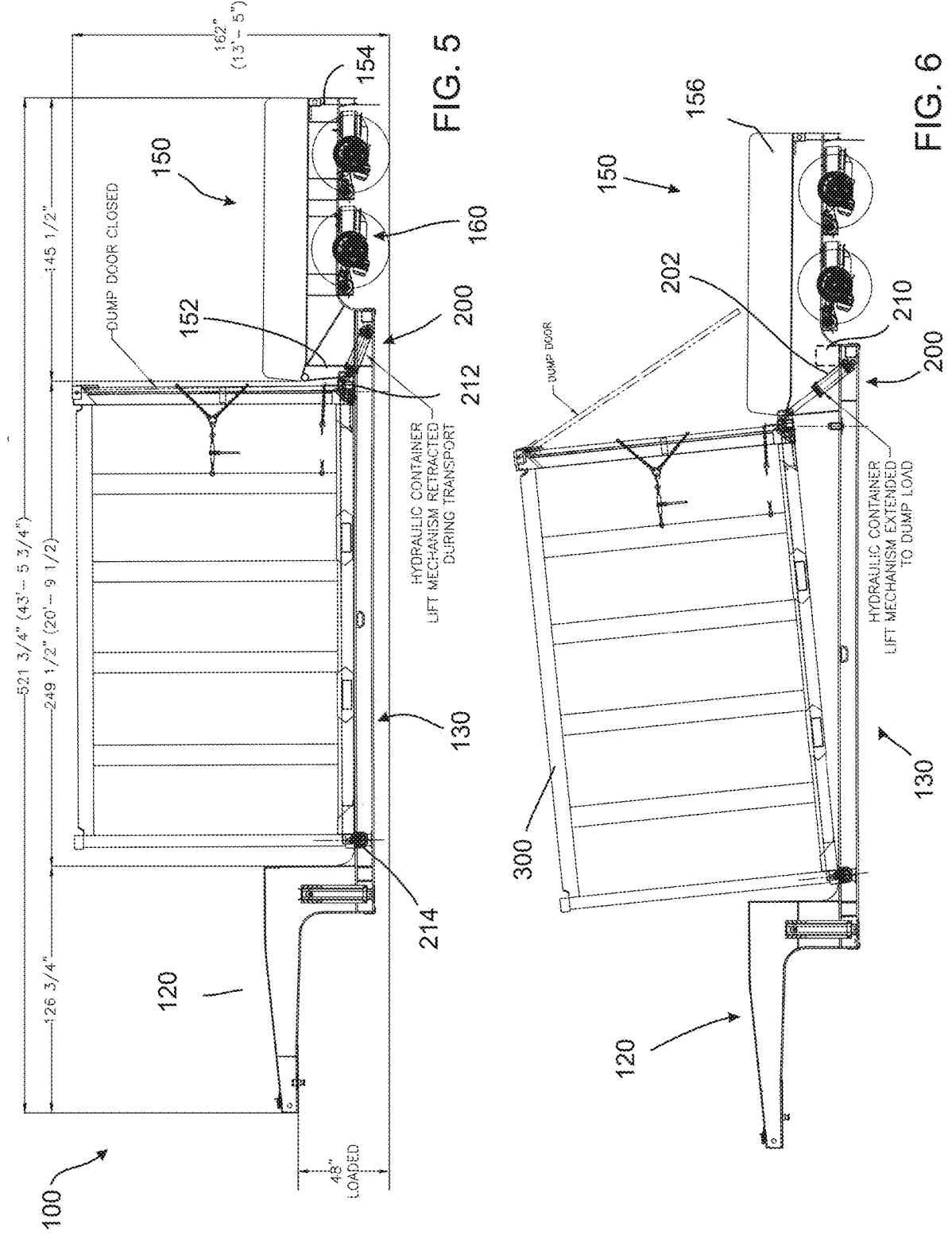
FIG. 5 is a side view of a trailer according to a second embodiment of the invention showing a container in a transporting position.
FIG. 6 is a side view of the trailer of FIG. 5 illustrating the trailer with the container in an emptying position.

Turning now to FIGS. 5 and 6, an alternate embodiment of the invention is shown. In this embodiment, the trailer 100 includes a trailer hitch section 120, a main cargo section 130 and a wheel support section 150 that supports wheel assemblies 160. The construction of the trailer hitch section 120, main cargo section 130 and wheel support section 150 is the same or similar to the first embodiment, thus, no further discussion is needed. However, in this embodiment of the trailer 100, there is no ramp section. Instead, the rear of the main cargo section 130 is attached to a vertical frame 152 extending downward from the front of the wheel support section 150. A hydraulic lift mechanism 200 is mounted to a wheel support frame 154 and connects to the rear bottom of the waste container 300. The hydraulic lift mechanism 200 includes a motor 210 which extends and retracts one or more hydraulic lifts 202 for lifting the bottom rear of the container. The hydraulic lift mechanism 200 is connected to the rear of the container. More preferably, there are two hydraulic lifts 202, one attached to each of the rear corners of the container through a container lock attachment 212. Each container lock attachment 212 is configured to secure the container to the upper end of the respective hydraulic lift 202 which also permitting the attachment to pivot as the hydraulic lifts extend, lifting the rear of the container. Likewise, the forward corners of the container are locked to the main cargo section 130 through a forward locking attachment 214 that permits the front of the container to pivot about the locking points. In an embodiment, rear each container lock attachment includes a bracket with a pin and the upper end of each of the hydraulic lifts 202 includes a hole through with the pin fits. The forward locking attachment is similarly constructed.

In this embodiment, the trailer 100 is preferably about 43 feet long. The trailer hitch section 120 is preferably about 126 inches long. The main cargo section 130 is preferably about 249 inches long. The wheel support section 150 is preferably about 145 inches long.

The operation of this second embodiment is now discussed. A waste container 300 loaded onto the main cargo section 130 with its cargo door facing rearward in its stored position as shown in FIG. 5. The waste container is locked to the main cargo section at its front and rear corners with the locking mechanisms 212, 214 as discussed above. In order to empty the contents of the waste container, the tractor trailer is driven onto an unloading ramp. The trailer 100 is unhitched from the tractor and the cargo door on the container is unlocked. The hydraulic mechanism 200 is activated to lift the rear of the waste container 300 to an emptying position as shown in FIG. 6. In this position, the rear bottom of the waste container 300 is substantially in alignment with the rear flatbed. The unloading ramp (tipper) is then tipped using the hydraulic lifting system as discussed above so that the front of the trailer 100 is lifted upwards. When the tipper gets to approximately forty degrees, the cargo door of the container will swing open and the contents of the container will begin to spill out onto the across the rear flatbed between the rear sidewalls 156 and off the rear of the trailer 100. Once the container is empty, the unloading ramp is lowered and then the waste container 300 is lowered to its storage position.

The present invention provides a system for facilitating emptying of twelve foot tall waste containers. The invention allows for the trailer to have a lower center of gravity when a waste container is placed on it, thus minimizing chances of tipping. The invention also permits quicker emptying of waste containers by minimizing the need to transfer containers at the waste disposal sites.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A system for transporting and emptying comprising:
a container having a top wall, bottom wall, two spaced apart side walls, each attached to an edge of the top and bottom walls, a front wall attached to an edge of the top wall, bottom wall and side walls, and a rear container door hingedly attached to a rear edge of the top wall, wherein the top wall, bottom wall, side walls, front wall and rear container door define an enclosure interior cavity for containing waste, the rear container door configured to pivot about its hinged attachment to the top wall when opening;
a drop body trailer comprising:
a trailer hitch section configured to engage with a tractor for towing of the trailer by the tractor, the trailer hitch section including horizontal framing members extending rearward from a front end to a rear end of the trailer hitch section, and cross-frames attaching to and providing structural support for the horizontal framing members, and a vertical frame structure that is attached to the rear end of the framing members and extending downward therefrom to a bottom end;
a main cargo section connected to the bottom end of the vertical frame structure, the main cargo section having at least two horizontal beams that are each attached at their front end to the bottom of the vertical frame structure and which extend rearward to a rear end of the horizontal beams, and a plurality of spaced apart crossbeams attached to and extending between the horizontal beams, the top of the two horizontal beams defining a cargo transport surface upon which the container rests during transport, the cargo transport surface being located below the horizontal framing members of the trailer hitch section;
a wheel support section including a plurality of wheel assemblies and a flatbed that extends rearward to the rear of the trailer, a wheel support frame is attached to the bottom of the flatbed and provides support for the flatbed and the wheel assemblies, and two side walls, each side wall attached to and extending upward from a lateral side of the flatbed, the side walls extending along substantially the entire length of the flatbed, the cargo transport surface being located below the flatbed of the wheel support section;
a door clearance assembly located on the main cargo section, on the wheel support section or between the main cargo section and the wheel support section, the door clearance assembly configured to permit the rear container door to swing open during tipping of the trailer while a front of the container is on and secured to the cargo transport surface and a rear of the container is on or raised off of the cargo transport surface without moving the container over the wheel support section; and
the container removably disposed on the main cargo section forward of the door clearance assembly,
wherein the container includes two front corners, each front corner attached to the main cargo section through a front container locking attachment that secures the front corner to the main cargo section so as to permit pivoting of a front edge of the container relative to the main cargo section;
wherein when the bottom wall of the container is disposed flat on the main cargo section during transport the bottom wall is below the flatbed of the wheel support section; and
wherein has a height of twelve feet or less and wherein the top wall of the container is fourteen feet or less from the ground when the container is on the main cargo section of the trailer.

2. The system of claim 1, wherein the door clearance assembly comprises a ramp section attached to a rear portion of the main cargo section and angling upward to a front end of the wheel support section, the ramp section including a ramp bed that is supported by a frame structure located underneath the ramp bed, the ramp section including two side walls, each side wall attached to and extending upward from a lateral side of the ramp bed, the side walls extending rearward for substantially the entire length of the ramp bed.

3. The system of claim 2, wherein the ramp bed of the ramp section forms an angle of approximately 12 degrees with respect to a horizontal plane on the horizontal beams.

4. The system of claim 2, wherein the flatbed is substantially horizontal, and wherein the flatbed is approximately 140 inches long and 102 inches wide, and the side walls of the wheel support section extend upwards approximately thirty-four inches, and wherein the side walls of the ramp section extend upwards approximately thirty-four inches.

5. The system of claim 1, wherein the bottom of the horizontal beams in the main cargo section are spaced above the ground approximately eight inches when the trailer is fully loaded, and wherein the main cargo section is approximately 230 inches long.

6. The system of claim 1, wherein the door clearance assembly comprises a hydraulic lift mechanism attached to the main cargo section at a location at the rear of the main cargo section, or attached to the wheel support frame at al location rearward of the main cargo section, wherein the hydraulic lift mechanism includes a motor configured when activated to extend and retract an end of at least one hydraulic lift, the end of the at least one hydraulic lift attached at or near a rear bottom corner of the container and configured when activated to raise the rear bottom corner of the container upward and forward away from the wheel support section to a height substantially the same as the front end of the flatbed of the wheel support section while the front corners of the container remain pivotably attached to the main cargo section such that the bottom wall of the container tips relative to the main cargo section, the end of the at least one hydraulic lift configured to extend upward and forward from where the hydraulic lift mechanism is attached to the trailer.

7. The system of claim 6, wherein the wheel support section includes a vertical frame extending downward from the front of the wheel support section and attaching to a rear portion of the main cargo section, and wherein the hydraulic lift mechanism is mounted to either the vertical frame or the rear portion of the main cargo section.

8. The system of claim 7, wherein the at least one hydraulic lift are two hydraulic lifts, each of the hydraulic lifts including an upper end that is attached to a respective rear corner of the container through a rear container locking attachment, the rear container locking attachment adapted to permit the upper end of each hydraulic lift to pivot relative to the rear container corner.

9. The system of claim 1, wherein the trailer is about 43 feet long, the trailer hitch section is about 126 inches long, the main cargo section is about 249 inches long and the wheel support section is about 145 inches long.

10. A method of emptying waste from a container on a trailer comprising the steps of:

providing a container having a rear container door hinged at the top of the container on a rear end of the container;

providing a trailer comprising:

a trailer hitch section configured to engage with a tractor for towing of the trailer by the tractor, the trailer hitch section including horizontal framing members extending rearward from a front end to a rear end of the trailer hitch section, and cross-frames attaching to and providing structural support for the horizontal framing members, and a vertical frame structure that is attached to the rear end of the framing members and extending downward therefrom to a bottom end;

a main cargo section connected to the bottom end of the vertical frame structure, the main cargo section having at least two horizontal beams that are each attached at their front end to the bottom of the vertical frame structure and which extend rearward to a rear end of the horizontal beams, and a plurality of spaced apart crossbeams attached to and extending between the horizontal beams, the top of the two horizontal beams defining a cargo transport surface upon which the container rests during transport, the cargo transport surface being located below the horizontal framing members of the trailer hitch section;

a wheel support section including a plurality of wheel assemblies and a flatbed that extends rearward to the rear of the trailer, a wheel support frame is attached to the bottom of the flatbed and provides support for the flatbed and the wheel assemblies, and two side walls, each side wall attached to and extending upward from a lateral side of the flatbed, the side walls extending along substantially the entire length of the flatbed, the cargo transport surface being located below the flatbed of the wheel support section; and a door clearance assembly located on the main cargo section, on the wheel support section or between the main cargo section and the wheel support section, the door clearance assembly configured to permit the rear container door to swing open during tipping of the trailer while a front of the container is on the cargo transport surface and a rear of the container is on or raised off of the cargo transport surface without moving the container over the wheel support section;

the method comprising the steps of:

placing the container onto the main cargo section with its rear container door facing rearward;

securing the container to the main cargo section;

placing the trailer on an unloading tipper ramp and unlocking the rear container door;

activating a hydraulic lift mechanism to cause the rear end of the container to lift upwards off of the main cargo section while a front end of the container remains on the main cargo section; and allowing the container door to swing open and the contents of the container to spill onto the flatbed of the wheel support section between the side walls and off the rear of the trailer.

11. The method of claim 10, wherein the door clearance assembly comprises a ramp section attached to a rear portion of the main cargo section and angling upward to a front end of the wheel support section, the ramp section including a ramp bed that is supported by a frame structure located underneath the ramp bed, the ramp section including two side walls, each side wall attached to and extending upward from a lateral side of the ramp bed, the side walls extending rearward for substantially the entire length of the ramp bed; and wherein the step of allowing the container door to swing open comprises allowing the contents of the container to spill onto the ramp bed of the ramp section and then pass onto the flatbed of the wheel support section.

12. The method of claim 10, wherein the hydraulic lift mechanism is attached to the main cargo section or the wheel support frame.

* * * * *